United States Patent [19]

Liscomb

[11] Patent Number: 5,126,381
[45] Date of Patent: Jun. 30, 1992

[54] BEAD PROCESSOR

[75] Inventor: Cristina Liscomb, Milford, Pa.

[73] Assignee: Dow Corning Corporation, Midland, Mich.

[21] Appl. No.: 286,464

[22] Filed: Dec. 19, 1988

[51] Int. Cl.$^5$ .............. C08F 2/48; C08F 220/10; C08J 9/04; B01J 13/02

[52] U.S. Cl. .................. 522/3; 522/182; 522/912; 522/915; 523/122; 523/300; 523/330; 526/88; 526/936; 526/922; 264/4.3; 264/4.7; 264/10; 264/12; 264/13; 264/14; 424/501; 424/502

[58] Field of Search .......... 522/3, 182, 915, 912; 264/4.3, 4.7, 10, 13, 14, 12; 523/137, 330, 300, 122, 330; 526/88, 936, 922; 424/501, 502

[56] References Cited

U.S. PATENT DOCUMENTS

| | | | |
|---|---|---|---|
| 2,875,047 | 2/1959 | Oster | 96/35 |
| 2,914,452 | 11/1959 | Schutze et al. | 204/162 |
| 3,215,612 | 11/1965 | Stewart, Jr. et al. | 204/154 |
| 3,549,366 | 12/1970 | Margerum | 96/35.1 |
| 4,172,276 | 10/1979 | Singelyn | 522/3 |
| 4,212,837 | 7/1980 | Oguchi et al. | 264/12 |
| 4,422,985 | 12/1983 | Morishita et al. | 264/14 |
| 4,435,524 | 3/1984 | Dinbergs | 526/88 |
| 4,458,057 | 7/1984 | Basu | 526/88 |
| 4,623,706 | 11/1986 | Timm et al. | 526/88 |
| 4,656,232 | 4/1987 | Nakaki et al. | 526/88 |
| 4,690,825 | 9/1987 | Won | 424/501 |

FOREIGN PATENT DOCUMENTS

| | | |
|---|---|---|
| 51210 | 10/1981 | European Pat. Off. . |
| 2608533 | 9/1976 | Fed. Rep. of Germany . |
| 2746489 | 4/1979 | Fed. Rep. of Germany . |
| 0038884 | 4/1974 | Japan . |
| 0811847 | 4/1959 | United Kingdom . |

Primary Examiner—Marion E. McCamish
Assistant Examiner—Susan Berman
Attorney, Agent, or Firm—Eckert, Seamans, Cherin & Mellott

[57] ABSTRACT

A process and apparatus are disclosed for producing polymerized beads containing actives such as perfumes and pesticides, by forming droplets from a solution of monomers and the actives. The solution is subjected to ultraviolet light to initiate polymerization. The droplets are caused to fall through a reaction vessel as polymerization continues so as to polymerize substantially spherical beads containing the actives. In one embodiment, the droplets are irradiated as they fall through the reaction vessel. In a second embodiment, the solution is irradiated prior to droplet formation and the fall. The beads are collected and can be cured if necessary. The process is preferably performed in an inert gas environment which most preferably is nitrogen. A nitrogen stream can serve as a carrier for the monomers and active ingredients. The nitrogen environment is maintained in the reaction vessel, and in the curing structure, if present.

15 Claims, 3 Drawing Sheets

BEAD PROCESSOR

BACKGROUND OF THE INVENTION

1. Field of the Invention

This invention relates to polymerized beads, and more particularly to a process and apparatus for producing polymerized beads containing actives, such as perfumes and pesticides, from a solution of monomers and the actives.

2. Description of the Prior Art

The standard method in the art of producing polymerized beads containing actives is suspension polymerization. The suspension polymerization process typically begins with a vat of monomer solution containing the actives in a suspending medium, usually water. The liquid is stirred to disperse the monomer and actives solution as droplets throughout the suspending medium. Polymerization is initiated by a chemical initiator or other initiation means suitable for the particular monomer or monomers being polymerized. The solution is stirred as the monomers polymerize into beads.

A uniform bead size is usually desirable. A uniform size is especially desirable to achieve a uniform release rate for actives contained within the beads. Uniformity in bead size is difficult to achieve with suspension polymerization. It would therefore be desirable to provide a process and apparatus for polymerizing beads whereby the size of the polymerized beads could be controlled.

Suspension polymerization is inefficient, as it is necessary to heat both the monomer and actives solution, and the suspending medium, to the reaction temperature. The suspending medium can have more than three times the weight of the monomer and actives solution, and the heating process can therefore require a large amount of energy.

Suspension polymerization is also relatively expensive due to the large amount of water that is necessary both to conduct the reaction, and to wash the resulting bead product. This water must be treated as a waste, and the disposal is expensive.

The use of irradiation to effect polymerization is known. Stewart, Jr., et al, U.S. Pat. No. 3,215,612 disclose a process and apparatus for preparing polymeric particles by irradiating a momomer mixture, particularly unsaturated aldehydes, with high energy electrons, protons and photons while maintaining the mixture in an agitated state with an inert gas. Shutze, et al, U.S. Pat. No. 2,914,452 disclose a process for polymerizing unsaturated hydrocarbons by irradiation. The use of ultraviolet light in polymerization reactions is disclosed by U.S. Pat. No. 3,549,366.

It would be desirable to provide a process and apparatus for polymerizing beads containing actives such as perfumes and pesticides that are economical, efficient, and that do not require the disposal of substantial amounts of waste materials. It further would be desirable to provide such a process and apparatus wherein the bead size could be controlled. It also would be desirable to provide a process and apparatus which would not require substantial washing of the bead product.

SUMMARY OF THE INVENTION

It is an object of the invention to provide an efficient process and apparatus to produce polymerized beads containing actives such as perfumes and pesticides.

It is another object of the invention to provide a process and apparatus to produce polymerized beads containing actives wherein substantial washing of the bead product is not required.

It is still another object of the invention to provide a process and apparatus to produce polymerized beads wherein the size of the beads can be controlled.

It is yet another object of the invention to provide a process and apparatus to produce polymerized beads wherein large amounts of energy will not be required to conduct the reaction.

These and other objects are accomplished by a process and apparatus for producing polymerized beads from a solution of monomers wherein droplets of the monomer solution are formed, preferably in a nozzle. Actives can be mixed with the monomer solution prior to droplet formation. A chemical initiator for the polymerization reaction is usually present. The droplets are then irradiated by ultraviolet light to initiate polymerization, and are permitted to free fall, as in a reaction vessel, to polymerize substantially spherical beads containing the actives.

The droplets are preferably formed in a suitable nozzle having one or more openings. The size of the openings in the nozzle can be used to control the size of the droplets and thus the polymerized bead product. The solution can be propelled through the nozzle by an inert moving gas, preferably nitrogen.

The source of ultraviolet irradiation can be selected from means known in the art. In one embodiment, the droplets are irradiated as they fall through a reaction vessel. The interior of the vessel contains the light source, and may contain light reflective surfaces to more evenly distribute the light throughout the vessel. In a second embodiment, the solution is irradiated through elongated discharge tubes communicating with the nozzle openings prior to droplet formation and the fall through the vessel. The interiors of the tubes bear the light sources, and can also include light reflective surfaces.

The process is preferably conducted within an enclosed reaction vessel. An inert gas environment can be maintained within the reaction vessel, and can be used to purge the reactants. The inert gas is preferably nitrogen. The inert gas can be propelled in a substantially upward direction, opposite the direction of fall of the polymerizing droplets, to prolong the fall time and thereby to promote polymerization through a given fall height.

The environment within the reaction vessel is preferably maintained at about 80 degrees C., a temperature which will assist the polymerization of many monomers. Some monomers will polymerize at temperatures at or below room temperature, while temperatures above about 100 degrees C. are not recommended because degradation of the polymerized product can occur.

The polymerized beads are collected at the base of the reaction vessel by suitable structure. A rotating tray can be used to collect the beads and to pass them to further processing or packaging steps. The centrifugal force imparted to the beads by the rotating tray is used to propel them through a suitable opening in the reaction vessel to the other stages of the process or to packaging stations.

It is sometimes necessary to cure the beads following the free fall polymerization. The beads can be passed from the reaction vessel to suitable curing structure such as a rotating curing drum. The residence time of the beads in the curing drum will depend upon the particular polymerization product and temperature. A preferable curing temperature is about 80 degrees C. It is desirable that curing take place in an inert gas environment, preferably nitrogen.

BRIEF DESCRIPTION OF THE DRAWINGS

There are shown in the drawings embodiments which are presently preferred it being understood, however, that the invention is not limited to the precise arrangements and instrumentalities shown, wherein.

DETAILED DESCRIPTION OF THE PREFERRED EMBODIMENTS

Figure 1:
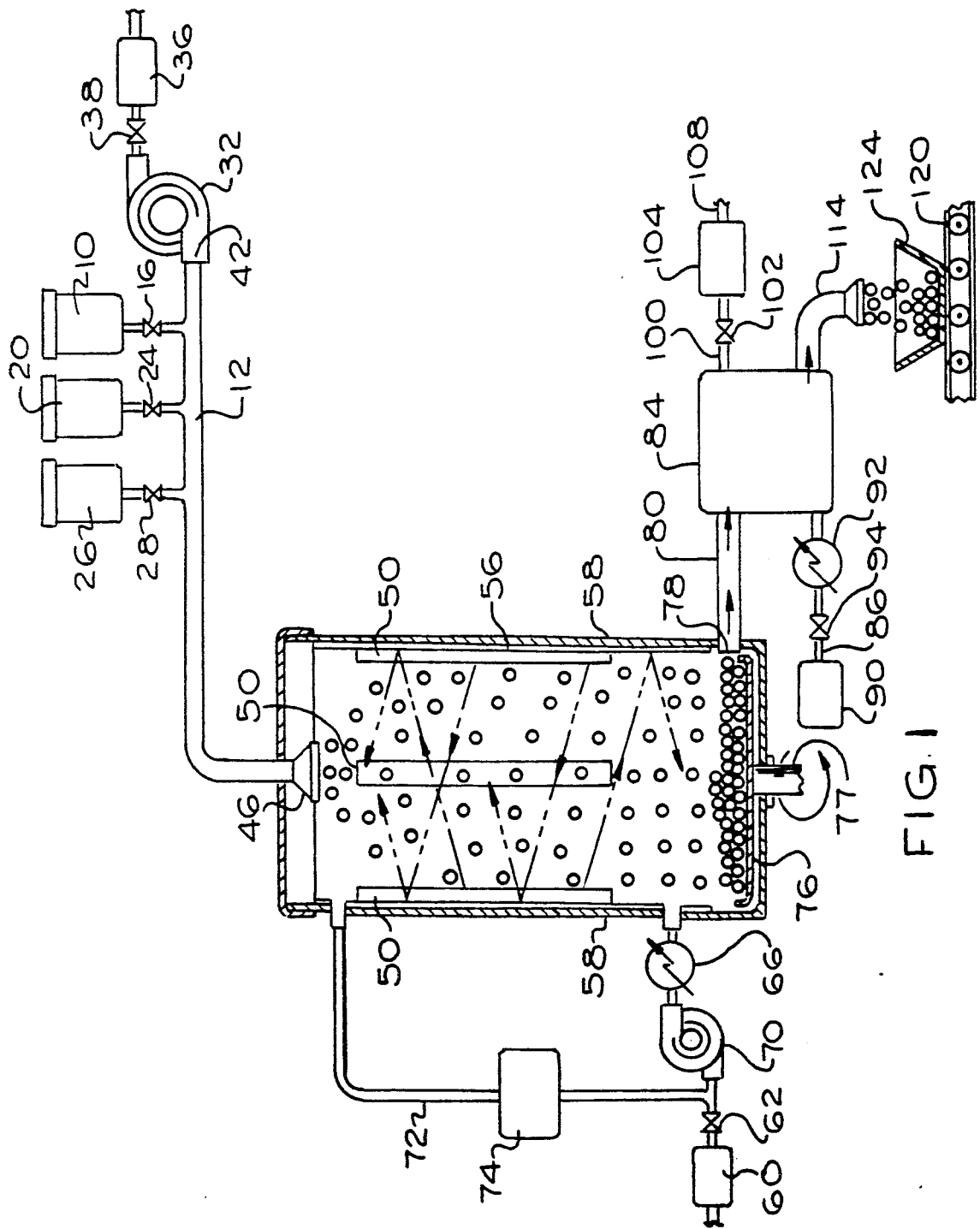
FIG. 1 is a schematic diagram, partially in section, of a bead process and apparatus according to the invention.

A first embodiment of the invention is depicted schematically in FIG. 1. The invention provides a process and apparatus whereby the monomer is passed through a nozzle and irradiated to begin polymerization. The monomer droplets are permitted to substantially free fall while polymerizing, so that the final product will be substantially spherical. The particles can then be collected and cured by a suitable curing apparatus, if necessary.

The monomer is supplied from a suitable monomer inlet source 10. Monomer from the monomer source 10 flows into a main reactant path 12. The flow rate of monomer can be controlled through a suitable monomer flow valve 16. Actives can be added to the monomer from an active source 20. Flow of actives from the active source 20 to the reactant path 12 can be controlled by an active flow valve 24. It is sometimes desirable to add one or more additional components to the reactant solution, such as a chemical initiator for the polymerization reaction. The initiator can be supplied by an initiator source 26, and fed to the reactant path 12 by a suitable initiator flow valve 28.

The reactant solution can be propelled through the reactant path 12 by suitable means, such as a moving transport gas stream. A blower 32 can receive a suitable transport gas from a supply 36. A transport gas valve 38 can be provided to meter transport gas into the blower 32. An outlet 42 of the blower communicates with the reactant path 12 to propel monomer, actives and other components such as initiators through the reactant path 12.

The reactant path 12 is connected to a nozzle means 46 which has one or more openings. The reactant solution is forced through the openings by the transport gas or other propulsion means. Droplets of solution are formed as the solution passes through the nozzle openings. The size of the openings in the nozzle can be used to control the size of the droplets and thus the polymerized bead product. The droplets are irradiated by one or more radiation sources 50, preferably emitting ultraviolet light, to initiate polymerization. The polymerizing droplets are allowed to substantially free fall during the polymerization process so that they will be substantially spherical when the polymerization process is complete.

The nozzle 46 and ultraviolet light sources 50 are preferably disposed within an enclosed housing 56, which is depicted in section to show internal features. Interior surfaces 58 of the housing 56 can be provided with a mirrored finish to promote an even distribution of the ultraviolet light. The active ingredients incorporated into the bead product during polymerization are frequently pungent and sometimes toxic. It is therefore advisable that the housing 56 be substantially hermetically sealed, and that an inert gas environment be maintained within the housing 56. The inert gas can be selected from any that are inert to the reaction. Nitrogen is a preferred inert gas. The inert gas environment can be supplied from a supply source 60 from which gas can be metered by a valve 62.

It is desirable that the environment within the housing 56 be maintained at an elevated temperature to facilitate polymerization. A heat exchanger 66 can be provided to elevate the temperature of the inert gas to the desired temperature for the reaction environment. A temperature of about 80 degrees C. is a preferred temperature for the reaction environment of many polymerization reactions.

It is desirable to provide an upward flow of inert gas within the reaction housing 56. The upward flow of gas slows the fall of the droplets through the reaction housing 56, and increases the time afforded the droplets to polymerize before they strike the bottom of the vessel and are collected. The nitrogen or other inert gas can be propelled in its upward flow by a suitable blower 70.

It is desirable to recirculate the flowing nitrogen. This can be accomplished by a recirculation line 72. A suitable filter 74 can be provided to filter the circulating inert gas stream to remove vapors and particulates which become entrained in the flowing gas.

The polymerized beads are collected by suitable structure and are passed from the reaction vessel 56 to other portions of the process and apparatus. Suitable collection structure can include the rotating tray 76, which can be driven by a shaft 77 connected to a suitable motor and which imparts a centrifugal velocity to the collected beads. The beads exit the reaction vessel 56 through a suitable exit opening 78 and exit path 80.

The polymerized beads exiting the reaction vessel 56 can sometimes be sent directly to final processing and packaging. It is necessary for some polymerization reactions, however, to further cure the collected polymerized beads. This can be accomplished in a suitable curing apparatus 84, which subjects the beads to elevated temperatures to effect the curing process. The curing apparatus can be selected from several known in the art, including a rotating drum. The temperature within the curing apparatus is preferably maintained at about 80 degrees C. to adequately cure many polymers, although it will be understood that other polymers may require higher or lower curing temperatures. The pressure within the curing apparatus 84 will normally be determined empirically.

An inert gas atmosphere is preferably maintained within the curing apparatus, and can be supplied through an inert gas inlet path 86 which receives gas from an inert gas source 90. A suitable heat exchange apparatus 92 can be provided to elevate the temperature of the incoming inert gas. Proper amounts of inert gas are metered to the curing apparatus 84 by a flow valve 94. Gas will eventually accumulate in the curing apparatus 84 and must be removed. Gas can be removed in a controlled fashion through a vent path 100 which is regulated by a vent control valve 102. It is desirable to filter the vented gas in a suitable filter apparatus 104. Gas leaving the filter 104 through a filter exit path 108 can either be vented directly to the atmosphere or recycled to the process.

The cured beads exit the curing apparatus through a product exit path 114. The product can then be passed to further treatment and packaging as illustrated by the conveyor apparatus 120 and container 124.

Figure 2:
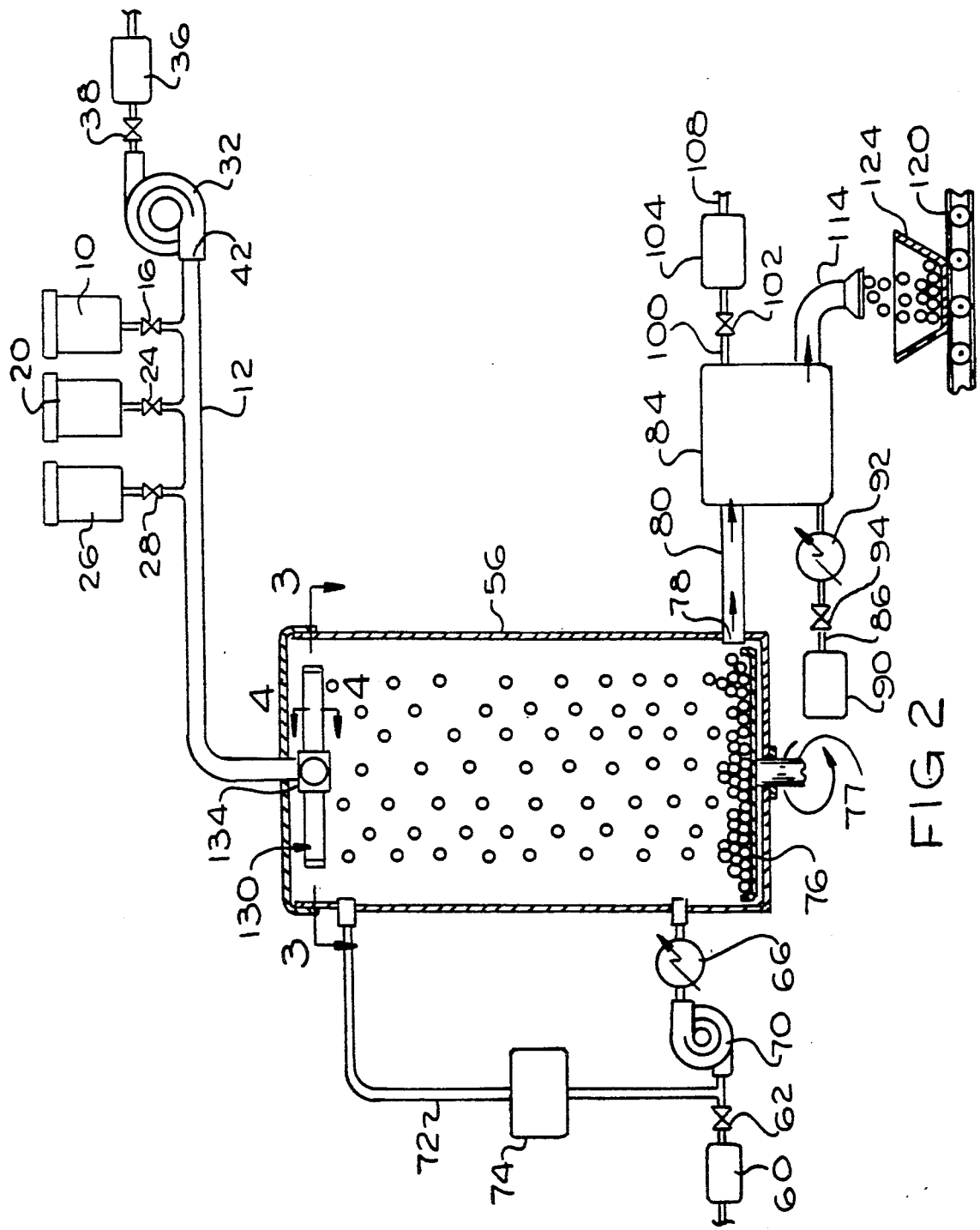
FIG. 2 is a schematic diagram, partially in section, of an alternative embodiment.
Figure 3:
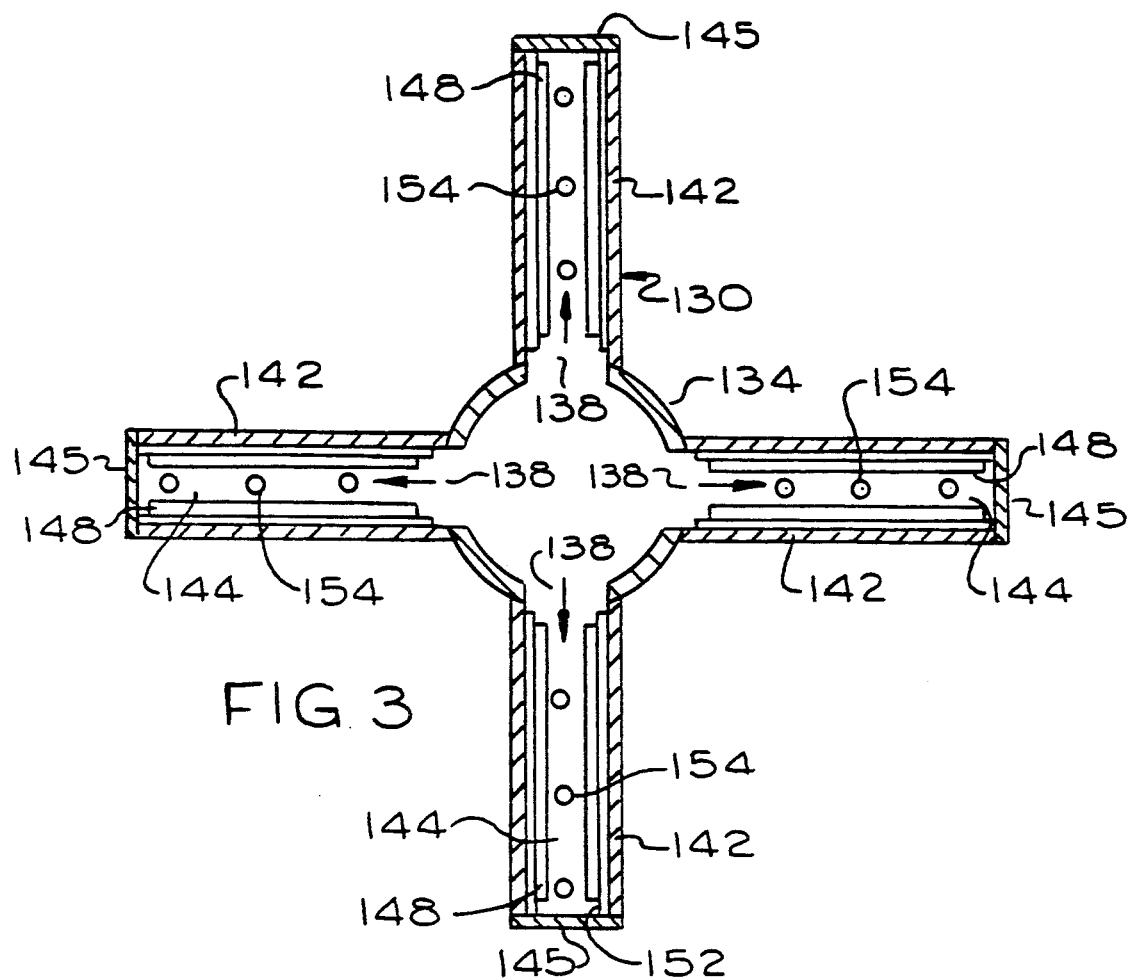
FIG. 3 is cross-section taken along line 3—3 in FIG. 2.
Figure 4:
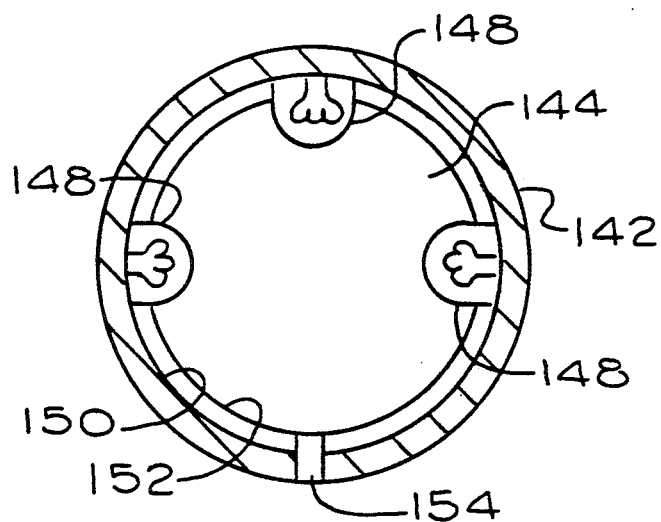
FIG. 4 is a cross-section taken along line 4—4 in FIG. 2.

In an alternative embodiment depicted in FIGS. 2-4, wherein like numbers refer to like elements, an alternative nozzle according to the invention is disclosed. The nozzle 130 is connected as previously described to the reactant path 12 and is utilized to form droplets from the reactant solution. The nozzle 130 comprises a manifold 134 into which reactant solution flows from the reactant path 12. One or more openings 138 are provided in the manifold 134. A discharge tube 142 communicates with each opening 138 such that the reactant solution is directed to an open interior passage 144 of the discharge tube 142 and is contained by a closed end 145.

Ultraviolet light sources 148 are disposed about an interior surface 150 of the discharge tubes 142. The ultraviolet light sources irradiate the solution as it passes through the interior passage 144 to initiate polymerization. The interior surface 150 of the discharge tubes 142 can be provided with a mirrored surface 152 to better distribute the light within the discharge passage 144 and to thereby insure thorough irradiation of the reactant solution. The irradiated solution passes out of the discharge tubes 142 through a plurality of nozzle openings 154, which form the solution into droplets. The droplets fall from the discharge tubes 142, and polymerize as they fall to form beads.

The invention can be used with any number of polymerization reactions, and is well suited for polymerization reactions which are directed to the entrapment of active ingredients such as perfumes and pesticides within the polymer beads. The term 'monomer' is used in the broadest sense to refer to those chemical sub-units which are to be linked in the polymerization reaction. The monomer can be selected from a host of suitable monomers, but preferably is a monomer that is capable of crosslinking. A preferred crosslinking monomer is ethylene glycol dimethacrylate (EGDM). Other suitable crosslinking monomers include propylene glycol dimethacrylate, diethylene glycol dimethacrylate, triethylene glycol dimethacrylate, tetraethylene glycol dimethacrylate, and trimethylol propane trimethacrylate. A chemical initiator can also be included to assist the polymerization reaction. Suitable initiators are known in the art and include benzoin and benzoin monomethylether.

The characteristics of the ultraviolet light produced by the light sources 50 and 148, such as intensity and wavelength, can vary with the particular polymerization reaction that is occurring. It may be preferable to determine the most efficient ultraviolet light, in terms of wavelength, intensity and other characteristics, empirically for the reaction and apparatus at hand.

The invention can be embodied in several forms without departing from the spirit or essential attributes thereof. Alternative temperatures, reactants, and apparatus of the invention can be chosen for the specific needs of the process at hand, and therefore, reference should be made to the following claims, rather than to the foregoing specification, as indicating the scope of the invention.

I claim:

1. A process for producing substantially spherical porous polymerized beads containing an active ingredient from a solution, comprising the steps of:

forming droplets of said solution in an inert gaseous environment, said solution containing unsaturated monomers capable of cross-linking, and at least one active ingredient;

exposing said solution to ultraviolet radiation, said ultraviolet radiation being of a wave length and dosage adapted to initiate polymerization of said monomers; and permitting said droplets to fall through said gaseous environment, said radiation step being adapted to cause substantially complete polymerization of said monomers only after said formation of droplets from said solution, said droplets at least partially polymerizing during said fall as substantially spherical, porous beads having said active ingredient entrapped therein, whereby said active ingredient can be released form said porous spherical beads to the surrounding environment.

2. The process of claim 1, further comprising a curing step following said fall, said curing step including the application of heat.

3. The process of claim 2, wherein said curing step comprises the heating of said polymerized beads in an inert gas environment maintained at a temperature of between about 75 degrees C. and about 85 degrees C.

4. The process of claim 3, wherein said inert gas environment is nitrogen maintained at a temperature of about 80 degrees C.

5. The process of claim 1, wherein said droplet forming step comprises propelling said solution through at least one nozzle means by a flowing inert transport gas stream.

6. The process of claim 5, wherein the transport gas is nitrogen.

7. The process of claim 1, wherein said inert gas flows in a direction substantially opposite to the fall of said droplets.

8. The process of claim 1, wherein said fall of said droplets and said irradiation occur substantially simultaneously.

9. The process of claim 1, wherein said irradiation precedes the fall of said droplets.

10. The process of claim 1, where said monomers are selected form the group consisting of ethylene glycol dimethacrylate (EGDM), propylene glycol dimethacrylate, diethylene glycol dimethacrylate, triethylene glycol dimethacrylate, tetraethylene glycol dimethacrylate, and trimethylol propane trimethacrylate.

11. The process of claim 1, wherein a chemical initiator is added to said solution prior to said droplet forming step.

12. The process of claim 11, wherein said initiator is selected from the group consisting of benzoin monomethylether and benzoin.

13. The process of claim 1, wherein said cross-linking monomer is ethylene glycol dimethacrylate.

14. A process for producing substantially spherical porous polymerized beads from a solution, comprising the steps of:

forming droplets of said solution in an inert gaseous environment, said solution containing unsaturated monomers capable of cross-linking;

exposing said solution to ultraviolet radiation, said ultraviolet radiation being of a wave length and dosage adapted to initiate polymerization of said monomers; and, permitting said droplets to fall through said gaseous environment, said radiation step being adapted to cause substantially complete polymerization of said monomers only after said formation of droplets from said solution, said droplets at least partially polymerizing during said fall as substantially spherical, porous beads.

15. The process of claim 14, wherein said inert gas flows in a direction substantially opposite the fall of said droplets.

* * * * *